(12) United States Patent
Rosario et al.

(10) Patent No.: US 8,812,470 B2
(45) Date of Patent: *Aug. 19, 2014

(54) METHOD AND APPARATUS TO REORDER SEARCH RESULTS IN VIEW OF IDENTIFIED INFORMATION OF INTEREST

(75) Inventors: Barbara Rosario, Berkeley, CA (US); William Noah Schilit, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,505

(22) Filed: May 18, 2012

(65) Prior Publication Data

US 2012/0233144 A1    Sep. 13, 2012

Related U.S. Application Data

(63) Continuation of application No. 11/771,883, filed on Jun. 29, 2007, now Pat. No. 8,195,660.

(51) Int. Cl.
*G06F 7/00* (2006.01)
*G06F 17/30* (2006.01)
*G06Q 30/02* (2012.01)

(52) U.S. Cl.
CPC .... *G06F 17/30864* (2013.01); *G06F 17/30867* (2013.01); *G06F 17/30067* (2013.01); *G06F 17/30011* (2013.01); *G06Q 30/02* (2013.01)
USPC ......................................................... 707/705

(58) Field of Classification Search
USPC ......................................................... 707/705
See application file for complete search history.

(56) References Cited

U.S. PATENT DOCUMENTS

| | | | |
|---|---|---|---|
| 5,655,148 A | 8/1997 | Richman et al. | |
| 5,935,262 A | 8/1999 | Barrett et al. | |
| 6,065,055 A * | 5/2000 | Hughes et al. | 709/229 |
| 6,411,950 B1 | 6/2002 | Moricz et al. | |
| 6,640,278 B1 * | 10/2003 | Nolan et al. | 711/6 |
| 7,062,451 B1 | 6/2006 | Dentel et al. | |
| 7,475,141 B1 | 1/2009 | Anderson et al. | |
| 7,555,556 B2 | 6/2009 | Motoyama | |
| 7,953,851 B2 | 5/2011 | Britton et al. | |
| 8,005,879 B2 * | 8/2011 | Bornhoevd et al. | 707/899 |
| 8,195,660 B2 | 6/2012 | Rosario et al. | |
| 2002/0023959 A1 | 2/2002 | Miller et al. | |
| 2002/0042793 A1* | 4/2002 | Choi | 707/6 |
| 2002/0078161 A1 | 6/2002 | Cheng | |

(Continued)

OTHER PUBLICATIONS

Proceedings of the NIPS 2005 Workshop on Learning to Rank, Agarwal, S., et al., Editors, (Dec. 9, 2005), 44 pgs.

(Continued)

*Primary Examiner* — Ajay Bhatia
*Assistant Examiner* — Jessica N Le
(74) *Attorney, Agent, or Firm* — Schwegman, Lundberg & Woessner, P.A.

(57) ABSTRACT

Various embodiments described herein provide systems, methods, and software to automatically reorder search results presented to users based on information specific to the user or the computing environment of the user. Some embodiments include a data store holding user or environment specific data that is used to identify search results that are more likely to be relevant to the user. These and other embodiments are described in greater detail herein.

16 Claims, 4 Drawing Sheets

(56) References Cited

U.S. PATENT DOCUMENTS

| | | | |
|---|---|---|---|
| 2002/0078293 A1 | 6/2002 | Kou et al. | |
| 2002/0111698 A1 | 8/2002 | Graziano et al. | |
| 2002/0169765 A1 | 11/2002 | Saltz | |
| 2003/0041088 A1 | 2/2003 | Wilson et al. | |
| 2003/0061267 A1 | 3/2003 | Dunstan | |
| 2003/0088544 A1 | 5/2003 | Kan et al. | |
| 2003/0093338 A1* | 5/2003 | Kim et al. | 705/27 |
| 2004/0006586 A1* | 1/2004 | Melchione et al. | 709/201 |
| 2004/0068486 A1* | 4/2004 | Chidlovskii | 707/3 |
| 2005/0060527 A1* | 3/2005 | Philyaw | 713/1 |
| 2005/0074018 A1* | 4/2005 | Zintel et al. | 370/401 |
| 2005/0136949 A1 | 6/2005 | Barnes, Jr. | |
| 2005/0160190 A1 | 7/2005 | Bhesania et al. | |
| 2005/0177387 A1* | 8/2005 | Mojsa | 705/1 |
| 2005/0210119 A1 | 9/2005 | Kumar | |
| 2006/0069663 A1 | 3/2006 | Adar et al. | |
| 2006/0069689 A1* | 3/2006 | Karklins et al. | 707/100 |
| 2006/0094360 A1 | 5/2006 | Jung et al. | |
| 2006/0156307 A1 | 7/2006 | Kunjithapatham et al. | |
| 2006/0165003 A1 | 7/2006 | Partridge | |
| 2006/0184693 A1 | 8/2006 | Rao et al. | |
| 2006/0195440 A1 | 8/2006 | Burges et al. | |
| 2006/0230130 A1 | 10/2006 | Cho et al. | |
| 2006/0233179 A1* | 10/2006 | Estrada et al. | 370/395.54 |
| 2006/0242129 A1 | 10/2006 | Libes et al. | |
| 2006/0247961 A1* | 11/2006 | Klemow | 705/8 |
| 2006/0271364 A1 | 11/2006 | Mirkovic et al. | |
| 2007/0075916 A1 | 4/2007 | Bump et al. | |
| 2007/0078850 A1* | 4/2007 | Aziz et al. | 707/6 |
| 2007/0112720 A1* | 5/2007 | Cao et al. | 707/1 |
| 2007/0112909 A1 | 5/2007 | Miyamoto et al. | |
| 2007/0198609 A1* | 8/2007 | Black et al. | 707/204 |
| 2007/0214131 A1 | 9/2007 | Cucerzan et al. | |
| 2007/0239569 A1* | 10/2007 | Lucas et al. | 705/28 |
| 2007/0244584 A1 | 10/2007 | John et al. | |
| 2008/0016101 A1 | 1/2008 | Ginsburg et al. | |
| 2008/0027567 A1* | 1/2008 | Philyaw | 700/40 |
| 2008/0195601 A1* | 8/2008 | Ntoulas et al. | 707/5 |
| 2008/0201132 A1 | 8/2008 | Brown et al. | |
| 2008/0243838 A1 | 10/2008 | Scott et al. | |
| 2008/0250010 A1 | 10/2008 | Rathod et al. | |
| 2008/0294617 A1 | 11/2008 | Chakrabarti et al. | |
| 2008/0313179 A1 | 12/2008 | Trepess et al. | |
| 2009/0006372 A1 | 1/2009 | Rosario et al. | |
| 2009/0019091 A1 | 1/2009 | Horvitz et al. | |
| 2011/0022632 A1* | 1/2011 | Kishimoto | 707/770 |
| 2012/0320784 A1* | 12/2012 | Edwards et al. | 370/252 |
| 2012/0331098 A1* | 12/2012 | Ertugrul et al. | 709/217 |
| 2013/0135993 A1* | 5/2013 | Morrill et al. | 370/228 |

OTHER PUBLICATIONS

"U.S. Appl. No. 11/771,883, Response filed Dec. 1, 2011 to Non Final Office Action mailed Sep. 1, 2011", 6 pgs.

"U.S. Appl. No. 11/771,883, Final Office Action mailed Jan. 28, 2010", 12.

"U.S. Appl. No. 11/771,883, Final Office Action mailed Nov. 23, 2009", 12 pgs.

"U.S. Appl. No. 11/771,883, Non Final Office Action mailed Sep. 1, 2011", 14 pgs.

"U.S. Appl. No. 11/771,883, Non-Final Office Action mailed Jun. 30, 2009", 14 pgs.

"U.S. Appl. No. 11/771,883, Notice of Allowance mailed Feb. 3, 2012", 14 pgs.

"U.S. Appl. No. 11/771,883, Response filed Jan. 15, 2010 to Final Office Action mailed Nov. 23, 2009", 7 pgs.

"U.S. Appl. No. 11/771,883, Response filed Apr. 27, 2010 to Final Office Action mailed Jan. 28, 2010", 7 pgs.

"U.S. Appl. No. 11/771,883, Response filed Sep. 30, 2009 to Non Final Office Action mailed Jun. 30, 2009", 10 pgs.

"E-Mail as Costly as Telephone Support", [online]. [archived Apr. 22, 2007]. Retrieved from the Internet: <URL: http://web.archive.org/web/20070422173840/http://www.quantos-stat.com/crm-news/news17.htm>, (2 pgs.).

"Reaching Out for Help", CIO Magazine, [online}. [archived Mar. 7, 2007]. Retrieved from the Internet: <URL: http://web.archive.org/web/20070307030241/http://www.cio.com/archive/100199_et.html>, (Oct. 1, 1999), 11 pgs.

"Why the PC Industry Must Improve New Technology's Quality and Ease of Use", Intel White Paper, (Mar. 19, 2004), 8 pgs.

Aslam, J. A., et al., "Models for Metasearch", Proceedings of the 24th International ACM SIGIR Conference on Research and Development in Information Retrieval (SIGIR '01), (2001), 276-284.

Bartell, B. T., et al., "Automatic Combination of Multiple Ranked Retrieval Systems", Proceedings of the 17 Annual International ACM SIGIR Conference on Research and Development in Information Retrieval, (1994), 173-181.

Bly, S., et al., "Broken Expectations in the Digital Home", Proceedings of Conference on Human Factors in Computing Systems (CHI '06), (Apr. 22-27, 2006, Montreal, Quebec, Canada), (2006), 568-573.

Charny, B., "The World Wide Web!", ZDNet News, [online]. [archived Oct. 7, 2001]. Retrieved from the Internet: <URL: http://web.archive.org/web/20011007012208/http://www.zdnet.com/zdnn/stories/news/0,4586,2667216,00.html>, (Dec. 23, 2000), 4 pgs.

Cohen, W. W., et al., "Learning to Order Things", Proceedings of the 1997 Conference—Advances in Neural Information Processing Systems, 10, (1998), 451-457.

Freund, Y., et al., "An Efficient Boosting Algorithm for Combining Preferences", Procedings of the Fifteenth International Conference on Machine Learning (ICML '98), (1998), 170-178.

Goldberg, D., et al., "Using Collaborative Filtering to Weave an Information Tapestry", Communications of the ACM, 35(12), (1992), 61-70.

Grinter, W. K., et al., "The Work to Make a Home Network Work", Proceedings of the Ninth European Conference on Computer-Supported Cooperative Work (ECSCW), (Sep. 18-22, 2005, Paris, France), (2005), 469-488.

Han, B., et al., "Reranking Medline Citations by Relevance to a Difficult Biological Query", Proceedings IaSTED International Conference on Neural Networks and Computational Intelligence, (Cancun, Mexico), (2003), 6 pgs.

Haveliwala, T. H., "Topic-Sensitive PageRank: A Context-Sensitive Ranking Algorithm for Web Search", IEEE Transactions on Knowledge and Data Engineering, 15(4), (2003), 784-796.

Huang, X., "Incorporating Contextual Retrieval into Okapi", Proceedings of the ACM SIGIR Workshop on Information Retrieval in Context (IRiX), (2005), 21-23.

Kim, H.-R., "Personalized Ranking of Search Results with Learned User Interest Hierachies from Bookmarks", Proceedings of the Workshop on Knowledge Discovery in the Web (KDD 2005), (2005), 10 pgs.

Konstan, J. A., et al., "GroupLens: Applying Collaborative Filtering to Usenet News", Communications of the ACM, 40(3), (1997), 77-87.

Lebanon, G., et al., "Cranking: Combining Rankings Using Conditional Probability Models on Permutations", Proceedings of the 19th International Conference on Machine Learning (ICML 2002), (2002), 363-370.

Lin, W.-H., et al., "Web Image Retrieval Re-Ranking with Relevance Model", Proceedings of the IEEE/WIC International Conference on Web Intelligence (WI '03), (Oct. 13-17, 2003, Halifax, Canada), (2003), 242-248.

Pazzani, M., et al., "Syskill & Webert: Identifying Interesting Web Sites", Proceedings of the Thirteenth National Conference on Artificial Intelligence (AAAI96) (vol. One), (1996), 54-61.

Schilit, B., et al., "Context-Aware Computing Applications", Proceedings, Workshop on Mobile Computing Systems and Applications, (1995), 85-90.

Schilit, W. N., et al., "Providing More Relevant Answer to a Query Via Query and/or Answer Processing", U.S. Appl. No. 11/614,519, filed Dec. 21, 2006.

Vogt, C., et al., "Using Relevance to Train a Linear Mixture of Experts", Proceedings, The Fifth Text REtrieval Conference (TREC-5), (1997), 13 pgs.

* cited by examiner

METHOD AND APPARATUS TO REORDER SEARCH RESULTS IN VIEW OF IDENTIFIED INFORMATION OF INTEREST

RELATED APPLICATION

This application is a continuation of U.S. patent application Ser. No. 11/771,883, entitled "METHOD AND APPARATUS TO REORDER SEARCH RESULTS IN VIEW OF IDENTIFIED INFORMATION OF INTEREST," filed Jun. 29, 2007, now issued as U.S. Pat. No. 8,195,660, which is hereby incorporated by reference in its entirety.

BACKGROUND INFORMATION

Searching for data using online searching tools often yields irrelevant results. Such search results are often irrelevant because searching utilities provide results based on what the public as a whole may be looking for rather than the specific user. Further, a user may not know how to search for the desired information. For example, a user searching for information on setting up a wireless router may not know or have much information about the router being set up. Thus, when such a user submits a query such as "wireless router setup," the user may receive search results about brand X routers when the user has a brand Y router.

DETAILED DESCRIPTION

Various embodiments described herein provide systems, methods, and software to automatically reorder search results presented to users based on information specific to the user or the computing environment of the user. Some embodiments include a data store holding user or environment specific data that is used to identify search results that are more likely to be relevant to the user. These and other embodiments are described in greater detail herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
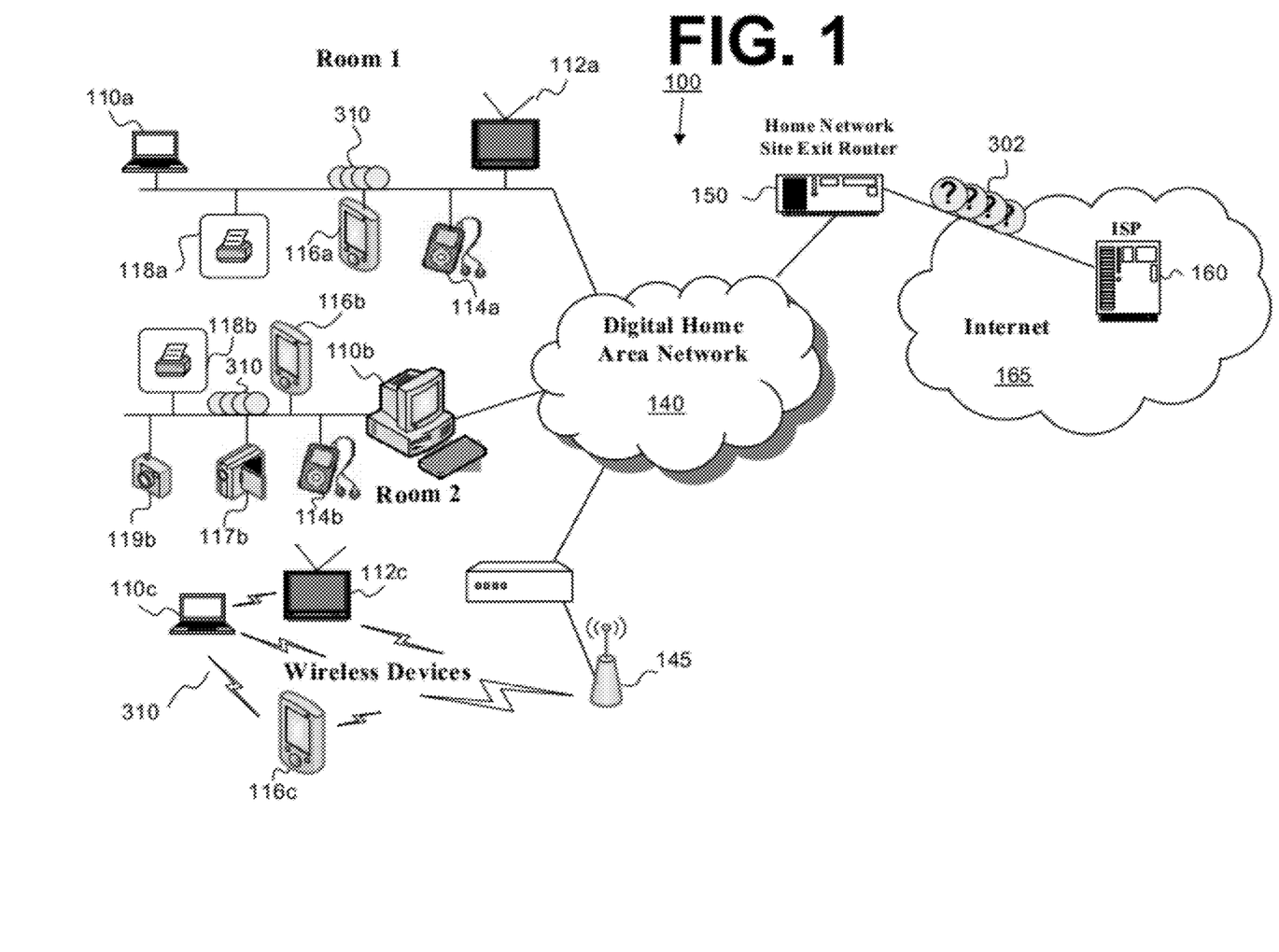
FIG. 1 illustrates a block diagram of an exemplary networked environment including a host platform according to an example embodiment.

FIG. 1 illustrates a block diagram of an exemplary networked environment including a host platform according to an example embodiment. Specifically, a host platform 110a, 110b, or 110c is illustrated as being coupled to a variety of different remote home network devices (e.g. 112-165). The host platform 110a, 110b, or 110c receives device specific information 310 from each of the network devices 112-165 connected to the network. In various embodiments, the device specific information may be shared by each of the host platforms and/or network devices within the network. The digital home network 100 may also connect by way of a home network site exit, such as a gateway, router 150 to an Internet Service Provider (ISP) 160. The ISP 160 provides the home network devices with access to the Internet 165, a worldwide, publicly accessible network of interconnected computer networks that transmit data by packet switching using standard communication protocols.

The network connections of the various network capable devices may be direct connections as illustrated by the host platform 110a, media center 112a, personal multimedia device 114a, personal digital assistant 116a, and printer 118a in Room 1 or indirect connections using another network capable device as illustrated in Room 2 by the host platform 110b connecting the personal multimedia device 114b, personal digital assistant 116b, the video camera 117b, the printer 118b, and the camera 119b to the home network 100. The digital home network 100 may include both wired and wireless connections to the different home network devices (110-165) as seen.

For illustrative purpose, home networks 100 may have a number of complex devices (e.g. 112-165) in which problems arise and induce the consumer to seek technical support. For example, home network 100 may contain a media center 112a in which the Compact Disk Player will not stream certain file formats. More specifically, the consumer may attempt to access information regarding this issue via the internet with a query similar to, "what file formats can my CD Player stream?"

Figure 2:
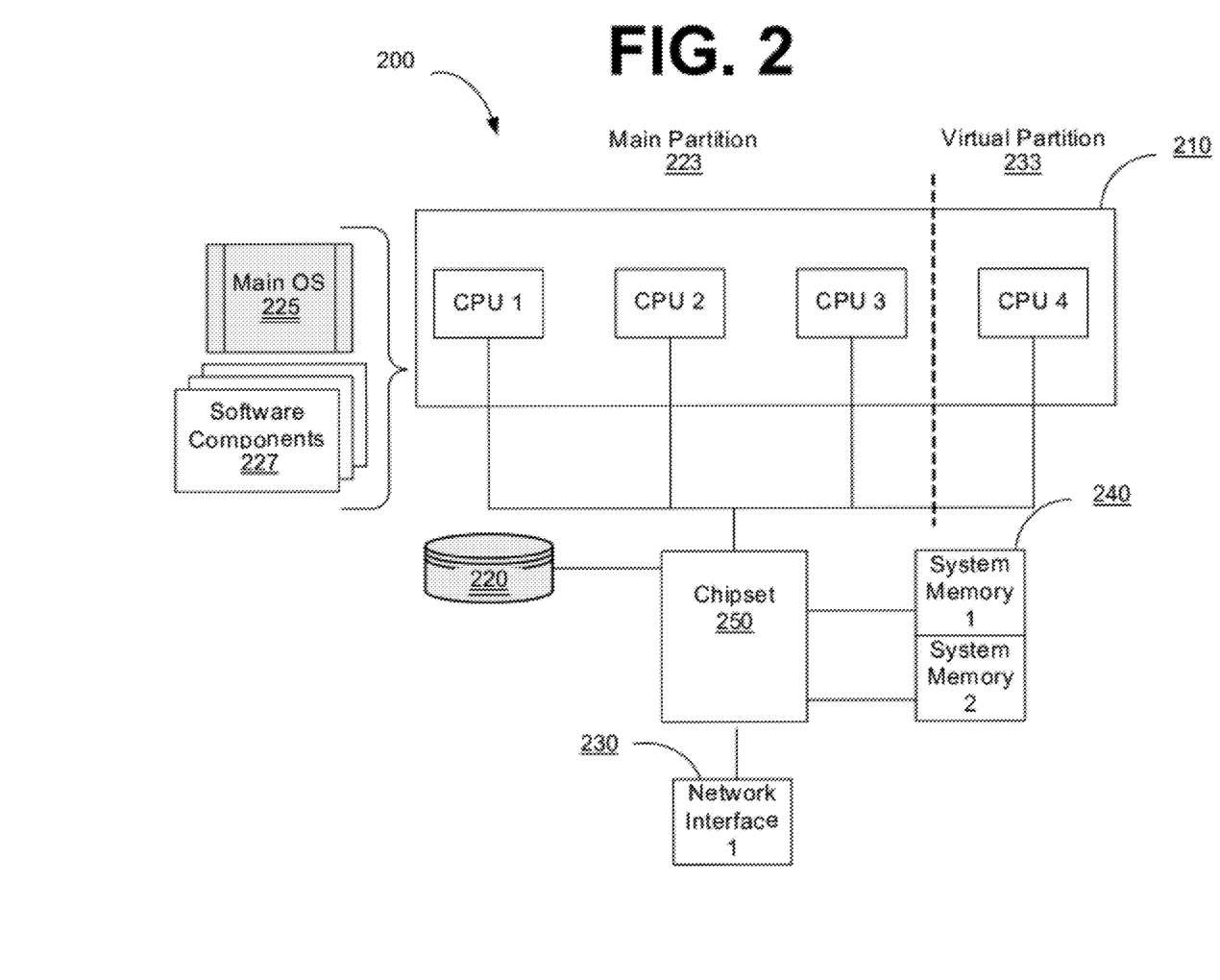
FIG. 2 illustrates a multi-processor host platform system as presented in FIG. 1 in further detail, according to an example embodiment.

In accordance with one embodiment, digital devices or appliances incorporating the processor host platform described in greater detail in FIG. 2 may be configured to perform the task of modifying the consumer query with device specific information 310 previously or presently obtained by the processor host platform. The modified query 302 may then be submitted to the internet or other technical support service. In the above illustration, the query may be expanded to, "what file formats can my Philips MC-i250 CD Player stream?" In various other embodiments, the host platform may be configured to perform a task of modifying a consumer query, an answer to a consumer query, or both.

FIG. 2 illustrates a multi-processor host platform system 200 as presented in FIG. 1 in further detail, according to an example embodiment. The system 200 includes a plurality of processors 210, a mass storage device 220, a network interface 230, memory 240, and a chipset 250 coupled to each other as shown.

In one embodiment, the network interface 230 may be configured to monitor the network for packets of device information and descriptions of devices within the network, e.g. device specific information. In various embodiments, the network interface may monitor the network for device specific information from a dedicated virtual partition 233 on the host platform. In this manner, the monitoring and obtaining of device specific information may be accomplished with resources not allocated to the main partition, and accordingly, if the main partition 223 is busy or hibernating, the virtual partition 233 is able to continue monitoring for new devices. In the alternative, the network interface may monitor the network for device specific information from a main partition 233 along side other software components 227.

In one embodiment, system memory 240 may store a plurality of programming instructions designed to enable the chipset 250 and the processors 210 to receive a query pertaining to a query subject and modify the query or an answer to the query based, at least in part, on information related to the query subject. In these and other embodiments, the system memory 240 may store a plurality of programming instructions designed to enable the chipset 250 and processors 210 to receive query results in a first order and reorder the results as a function of a scoring algorithm that takes into account stored data about devices present on the network.

The plurality of processors 210 are the primary resources allocated to the respective partitions and may include any variety of processors known in the art including, in one embodiment, processors having a plurality of processing cores, for example Intel® Pentium® D Processors, Intel® Core™ 2 Extreme, and Intel® Core™ 2 Duo. The processors may be adapted to function within generic computer systems, as well as, Intel® ViiV Embedded Personal Computers ("ViiV EPC"). The plurality of processors 210 may comprise an integrated circuit ("IC"), such as a semiconductor integrated circuit chip. In the embodiment illustrated in FIG. 2, the plurality of processors 210 may include a plurality of central processing units ("CPUs"). Additional or fewer processors may be used in various embodiments. The plurality of processors 210 may be logically and/or physically divided into a plurality of partitions. For example, in the illustrated embodiment, the processors 210 are divided into a main partition 223 and a virtual partition 233.

The at least one primary host processor associated with the main partition 223 is adapted to execute the one or more software components 227 and the operating system 225 which may include, for example, a general operating system such as Windows® operating systems, Linux, etc. The at least one processor associated with virtual partition 233 may be adapted to perform the monitoring and obtaining of device specific information from devices within or added to the network.

System memory 240 may include semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 240 may comprise other and/or later-developed types of computer readable memory. Machines-readable firmware program instructions may be stored in memory 240. As described above, the instructions may be accessed and executed by the main partition 223 and/or the virtual partition 233 of host processor 210.

Figure 3:
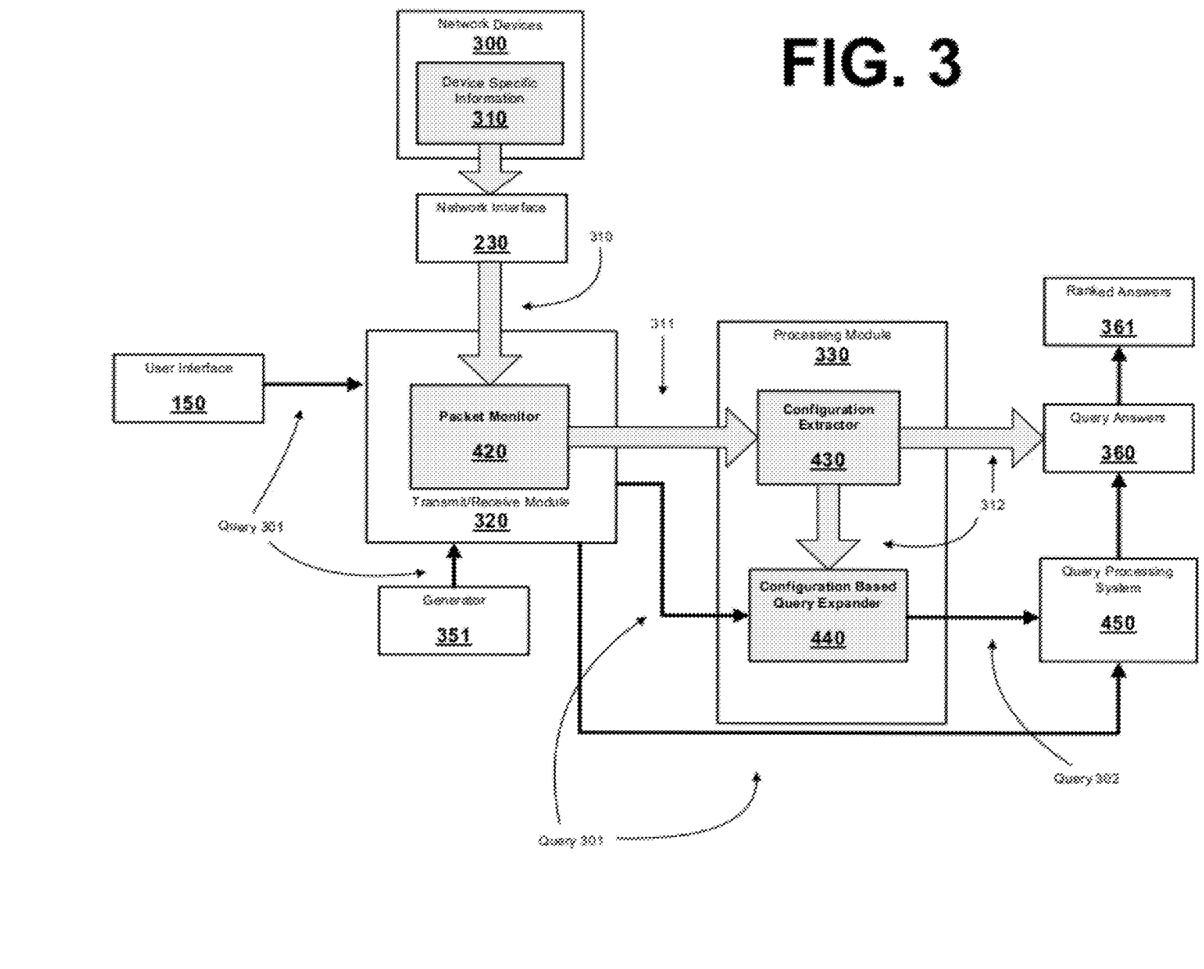
FIG. 3 illustrates a logical block diagram of a system according to an example embodiment.

FIG. 3 illustrates a logical block diagram of a system according to an example embodiment. The system of FIG. 3 provides an example application of query modification based on home network configurations as presented in FIGS. 1 and 2 is illustrated, in accordance with various embodiments. More specifically, FIG. 3 depicts the task related interactions associated with performing a modification of a query based on device specific information 310 received from network devices 300.

In one embodiment, network devices 300 transmit device specific information 310 to a transmit/receive module 320 via a network interface 230. It is contemplated that the transmit/receive module may be implemented in a hardware configuration or a software configuration. In one embodiment, the transmit/receive module 320 may contain a packet monitor 420. The packet monitor 420 may be integrated into a network interface card (not shown), run in a dedicated virtual partition 233 on a computer system, or run in a main partition 223 along side other applications. In various embodiments, the packet monitor 420 extracts or receives device information from a network device 300. In one embodiment, the packet monitor 420 monitors for Universal Plug and Play advertisements and device descriptions and maintains a time ordered log of the device information it receives. This log allows for query modification, as discussed below, when the network device 300 is not present, not powered on, or incapable of transmitting device specific information 230.

In one embodiment, the packet monitor 420 transmits the time ordered log 311, from the transmit/receive module 320, to a configuration extractor 430 located in a processing module 330. The processing module 330 may be implemented in a hardware configuration or a software configuration similar to the transmit/receive module 320. The configuration extractor 430 takes the device specific information 311 and creates word groups that are correlated with each other. In one embodiment, the word groups are stored in a configuration table 312. The configuration table 312 may then be applied, in various embodiments, to a query for the purpose of modification as will be discussed more below.

In various embodiments, a query may be entered by either of a user interface 350 or a generator 351. The user interface may be any one of a keyboard, a mouse, a computer screen, a touch pad, or any other user device capable of submitting a query. The generator 351 may be implemented in a hardware or software configuration.

In one embodiment, the generator 351 automatically generates a query 301 upon an occurrence of a network device being detected or a problem occurring within the network. The query 301 may pertain to common issues regarding the network device or specific issues relating to the network device or the network in general. Similarly, in other embodiments, the user may generate a query 301 upon an occurrence of a problem with a device or a network.

In various embodiments, the query 301 initiated by the generator 351 or the user interface 350 is received by the transmit/receive module 320 and transmitted to at least one of a configuration based query expander 440 in a processing module 330, or a query processing system 450. In one embodiment, the transmit/receive module 320 sends the query 301, as received, directly to a query processing system

450. The query processing system may be any of an internet search engine, a telephony system, an online chat-room, or any other software or hardware configuration capable of receiving queries. In response to receiving the query 301, the query processing system returns query answers 360. In various embodiments, the configuration extractor 430 may then apply the configuration table 312 to the query answers to perform the post processing function of ranking the answers resulting in ranked answers 361. The ranked answers 361 may provide a fast and viable solution to a user's query or, in one embodiment, provide a list of the most likely causes of a problem or a list of the most common problems associated with a device should the generator 351 initiate the query.

In another embodiment, the query 301 is received by the transmit/receive module 320 and transmitted to a configuration based query expander 440 located in a processing module 330. Once a query 301 is received, the configuration based query expander 440 may apply the configuration table 312 from the configuration extractor 430 in order to concatenate or expand the query 301 with synonymous terms from the table 312. The expansion may include simply adding terms, deleting terms while adding others, or simply concatenating terms. In one embodiment, the configuration based query expander 440 then sends the modified query 302 to a query processing system 450 which returns query answers 360. The process of modifying the query prior to submitting it to a query processing system, or pre-processing, may create a more well-framed query which returns more relevant answers.

In yet another embodiment, pre-processing on a query 301 is performed and returns query answers 360. The query answers may then undergo a similar post processing procedure to that describe above in which the configuration extractor applies the configuration table 312 to the pre-processed query answers returning ranked answers 361. In such a manner the system may incorporate pre-processing and post processing; only post processing; or only pre-processing. The post processing in such embodiments, may include re-ranking of at least some of the answers, such as Internet search engine query results. Further detail of such embodiments is described in greater detail below.

Although most embodiments described herein pertain to a home network environment and use of the configuration extractor 430 to build a configuration table 312, other embodiments are contemplated. For example, some embodiments may include one or both of pre and post-processing based on virtually any type of information of interest. That information may be represented in a table as words and the table may be used to expand searches or make them more precise. The information may also be used to re-rank search results.

Figure 4:
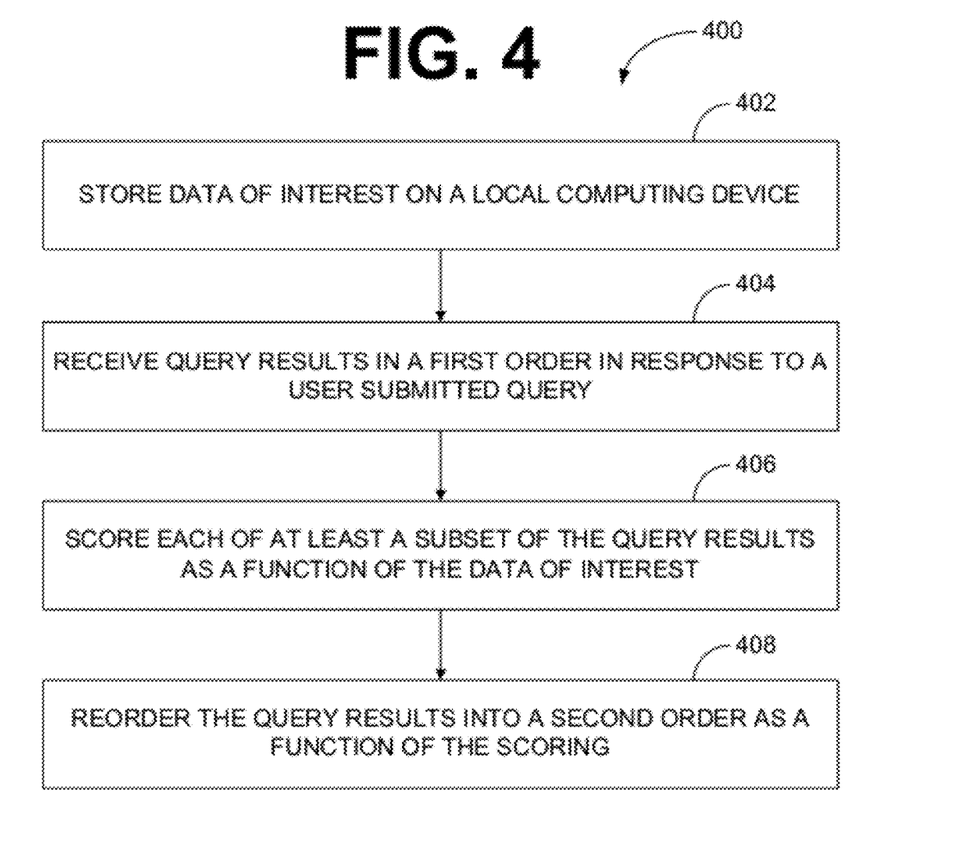
FIG. 4 is a block flow diagram of a method according to an example embodiment.

FIG. 4 is a block flow diagram of a method 400 according to an example embodiment. The example method 400 is a post-processing method of processing search results, such as search results from an Internet search engine or other searching tool. The example method 400 includes storing data of interest on a local computing device 402. The data of interest may be a configuration table as described above. However, the data of interest may include any data that a user or a system may be interested in. This data may be accumulated via a question and answer session, a tool that generates indexes as a function of the contents of files and documents stored on a computing device, or in another manner.

The method 400 further includes receiving query results in a first order in response to a user submitted query 404 and scoring each of at least a subset of the query results as a function of the data of interest 406. Based on the scoring, the method 400 also includes reordering the query results into a second order as a function of the scoring 408. The result is search results that are received based on a specific query, but are sorted based on information of interest to the query submitter.

In some embodiments, the scoring may include retrieving at least a subset of web pages represented in Internet search engine query results and identifying and counting unique features represented in the data of interest that occur in each of the retrieved web pages. The scoring may also include counting occurrences of each unique feature in each of the retrieved web pages scoring each of at least the subset of the query results as a function of a website from which the respective webpage is retrieved. The score may include one or more of these, and other, scoring mechanisms which may be considered individually or in sum.

Scoring each of at least the subset of the query results based on data of interest may also include scoring each of a plurality of features of a retrieved web page, weighting at least one feature, and summing each of the features, including weighted features, to determine a score for each retrieved webpage.

The re-ranking, or reordering, of search results may be considered in a more formal manner in view of contextual ranking. For a given user's query $q_k$ with the corresponding context $C_k$ (output of the configuration extractor), for each of the first P web pages $p_{jk}$ returned by the search engine, its new rank DR $(p_{jk})$ (as for Device Rank) may be calculated as follows.

First, for each page $p_{jk}$ a set of features $f_{ijk}$ is extracted, such as, for example:

$$f_{1jk} = \sum_{c_k} C(c_k, p_{jk})$$

where $c_k$ are all the words in the context $C_k$ and $C(c_k, p_{jk})$ is the count of all instances of $c_k$ in $p_{jk}$ (i.e. $f_{Ijk}$ is proportional to the total number of context words in $p_{jk}$), or:

$$f_{2jk} = \sum_{c_k} C'(c_k, p_{jk})$$

where C' is 1 if $c_k$ is in $p_{jk}$, 0 otherwise (i.e. $f_{2jk}$ is proportional to the number of unique context words in $p_{jk}$). Another feature would indicate if the context words appear in the URL of $p_{jk}$ or in its title. These features allows incorporation of contextual information. Any number of other types of information and constraints may be included through the features $f_{ijk}$. For example, A feature that would allow promoting of "high quality," domain specific Web sites may be included, as for example:

$$f_{3jk} = \begin{cases} 1 & \text{if } p_{jk} \in D \\ 0 & \text{otherwise} \end{cases}$$

where D is the set of all domain specific sites identified to contain important or noteworthy information.

A linear combination of these features $f_{ijk}$ may then be calculated:

$$S(p_{jk}) = \sum_{i=1}^{N} w_i * f_{ijk}$$

Intuitively, one can see that the higher the value of this sum the more relevant is the page $p_{jk}$ to the query and context, this sum is thus an example of a "score" for page $p_{jk}$. The parameters $w_i$ are the weights assigned to each feature. However, the original rank of the search engine may be used, SER($p_{jk}$) in some embodiments. The original rank may be added to the score S($p_{jk}$) as an additional feature multiplied by a factor $w_0$ which determines how much weight to give to the original search engine used. In such embodiments, the final score may be represented as:

$$DRS(p_{jk} | q_k, C_K) = w_0 * g(SER(p_{jk})) + \sum_{i=1}^{N} w_i * f_{ijk}$$

where SER($p_{jk}$) is the search engine rank for the query $q_k$ which is just the position of the web page $p_{jk}$ in the returned list (rank=1 being the rank of first page returned).

Given these scores DRS($p_{jk}$), the web pages $p_{jk}$ may be ranked by obtaining the Device Rank DR($p_{jk}$), (rank=1 being the rank of the page with the highest score and so on). The ranked pages may then be presented via a web browsing application accordingly to DR($p_{jk}$). In some embodiments, a "better" ranking DR($p_{jk}$) may be made through the parameters W=($w_0, w_1, \ldots w_N$), therefore reducing the problem to a machine learning task. The weighting may be resolved via a machine learning technique, such as logistic regression, or a variant thereof. The learning of these parameters w allows finding of better rankings than the original search engine used because it incorporates the context of the queries and user specific information.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    monitoring packets of network traffic on a local network of a local computing device for device specific information and device descriptions of network devices connected to the local network;
    based on information of the devices connected to the local network from the monitoring, storing data of interest on the local computing device, the data of interest consisting essentially of the device specific information and device descriptions of the network devices connected to the local network to which the local computing device is also connected;
    receiving a query with regard to the data of interest stored on the local computing device;
    modifying the query based on the data of interest and submitting the query to at least one query processor;
    receiving query results, including query results form an Internet search engine, in a first order in response to the submitted query;
    scoring each of at least a subset of the query results as a function of the data of interest, the scoring including:
        retrieving at least a subset of web pages represented in the Internet search engine query results; and
        identifying and counting unique features represented in the data of interest that occur in each of the retrieved web pages;
    scoring each of a plurality of features of a retrieved web page;
    weighting at least one feature; and
        summing each of the features, including weighted features, to determine a score for each retrieved webpage; and
    reordering the query results into a second order as a function of the scoring.

2. The method of claim 1, wherein the data of interest includes data identifying one or more properties of a configuration of the local computing device.

3. The method of claim 2, wherein the data identifying one or more properties of the configuration of the local computing device includes data identifying one or more devices operable within a computing environment of the local computing device.

4. The method of claim 3, wherein at least one of the one or more devices operable within the computing environment of the local computing device is a device operative on local network to which the local computing device is connected.

5. The method of claim 1, wherein the identifying and counting unique features represented in the data of interest that occur in each of the retrieved web pages includes counting occurrences of each unique feature in each of the retrieved web pages.

6. The method of claim 1, wherein the scoring further includes scoring each of the retrieved web pages as a function of a website from which a respective web page is retrieved.

7. The method of claim 1, further comprising:
    deriving a value for each search result from a position of the respective search result in the first order; and
    adding to a result of the scoring of each query result to the derived value of a respective search result.

8. The method of claim 7, further comprising:
    weighting one or more of a score of each search result and the value derived from a position of each search result in the first order.

9. A non-transitory computer readable medium, with instructions stored thereon, which when executed by at least one processor of a computing device, cause the computing device to:
    monitor packets of network traffic on a local network of a local computing device for device specific information and device descriptions of network devices connected to the local network;
    based on information of the devices connected to the local network from the monitoring, store data of interest on the local computing device, the data of interest consisting essentially of device specific information and device descriptions of network devices connected to the local network to which the local computing device is also connected;

receive a query with regard to the data of interest stored on the local computing device;

modify the query based on the data of interest and submitting the query to at least one query processor;

receive query results, including query results form an Internet search engine, in a first order in response to the submitted query;

score each of at least a subset of the query results as a function of the data of interest, the scoring including:
  retrieving at least a subset of web pages represented in the Internet search engine query results; and
  identifying and counting unique features represented in the data of interest that occur in each of the retrieved web pages;

scoring each of a plurality of features of a retrieved web page;

weighting at least one feature; and summing each of the features, including weighted features, to determine a score for each retrieved webpage; and reorder the query results into a second order as a function of the scoring.

10. The non-transitory computer readable medium of claim 9, wherein the data of interest includes data identifying one or more properties of a configuration of the local computing device.

11. The non-transitory computer readable medium of claim 10, wherein the data identifying one or more properties of the configuration of the local computing device includes data identifying one or more devices operable within a computing environment of the local computing device.

12. The non-transitory computer readable medium of claim 11, wherein at least one of the one or more devices operable within the computing environment of the local computing device is a device operative on local network to which the local computing device is connected.

13. An apparatus comprising:
  at least one processor, at least one memory device, and at least one network interface device;
  an Internet browsing application stored on the at least one memory device and executable by the at least one processor;
  a search result re-ranking module stored on the at least one memory device and executable by the at least one processor to be operable with the Internet browsing application to:
    monitor packets of network traffic on a local network of the apparatus for device specific information and device descriptions of network devices connected to the local network;
    based on information of the devices connected to the local network from the monitoring, store data of interest on the at least one memory device, the data of interest consisting essentially of device specific information and device descriptions of network devices connected to the local network to which the apparatus is also connected;
    receive a query with regard to the data of interest stored on the at least one memory device;
    modify the query based on the data of interest and submitting the query, via the at least one network interface device, to at least one query processor;
    receive, via the at least one network interface device form an Internet search engine, search results in a first order in response to a search submitted to an Internet searching utility through the Internet browsing application;
    score each of at least a subset of the search results as a function of data of interest for the apparatus, the scoring including:
      retrieving at least a subset of web pages represented in the Internet search engine query results; and
      identifying and counting unique features represented in the data of interest that occur in each of the retrieved web pages;
    scoring each of a plurality of features of a retrieved web page;
    weighting at least one feature; and
      summing each of the features, including weighted features, to determine a score for each retrieved webpage; and
    reorder the search results into a second order as a function of the score of each of the scored search results.

14. The apparatus of claim 13, wherein the data of interest includes data identifying one or more properties of a configuration of the local computing device.

15. The apparatus of claim 14, wherein the data identifying one or more properties of the configuration of the local computing device includes data identifying one or more devices operable within a computing environment of the local computing device.

16. The apparatus of claim 15, wherein at least one of the one or more devices operable within the computing environment of the local computing device is a device operative on local network to which the local computing device is connected.

* * * * *

UNITED STATES PATENT AND TRADEMARK OFFICE
CERTIFICATE OF CORRECTION

PATENT NO.         : 8,812,470 B2
APPLICATION NO.    : 13/475505
DATED              : August 19, 2014
INVENTOR(S)        : Rosario et al.

Page 1 of 1

It is certified that error appears in the above-identified patent and that said Letters Patent is hereby corrected as shown below:

On the Title Page

On page 2, in column 2, under "Other Publications", line 26, delete "Procedings" and insert --Proceedings--, therefor On page 2, in column 2, under "Other Publications", line 46, delete "Hierachies" and insert --Hierarchies--, therefor On page 2, in column 2, under "Other Publications", line 70, delete "REtrieval" and insert --Retrieval--, therefor

In the Claims

In column 8, line 8, in Claim 1, delete "form" and insert --from--, therefor

In column 9, line 8, in Claim 9, delete "form" and insert --from--, therefor

In column 10, line 17, in Claim 13, delete "form" and insert --from--, therefor

Signed and Sealed this
Twenty-fifth Day of November, 2014

Michelle K. Lee
*Deputy Director of the United States Patent and Trademark Office*